US012619061B2

(12) United States Patent
Langholz et al.

(10) Patent No.: US 12,619,061 B2
(45) Date of Patent: May 5, 2026

(54) MICROSCOPE AND METHOD FOR AUTOFOCUSING

(71) Applicant: Carl Zeiss Microscopy GmbH, Jena (DE)

(72) Inventors: Nils Langholz, Jena (DE); Markus Sticker, Jena (DE); Thomas Nobis, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 95 days.

(21) Appl. No.: 18/598,162

(22) Filed: Mar. 7, 2024

(65) Prior Publication Data

US 2024/0319487 A1 Sep. 26, 2024

(30) Foreign Application Priority Data

Mar. 21, 2023 (DE) .......................... 102023107032.0

(51) Int. Cl.
G02B 21/36 (2006.01)
G02B 21/04 (2006.01)

(52) U.S. Cl.
CPC ........... G02B 21/367 (2013.01); G02B 21/04 (2013.01); G02B 21/361 (2013.01)

(58) Field of Classification Search
CPC .... G02B 21/367; G02B 21/04; G02B 21/361; G02B 21/244; G02B 21/245; G02B 21/241; G02B 7/09
See application file for complete search history.

(56) References Cited

U.S. PATENT DOCUMENTS 4,725,722 A 2/1988 Maeda et al.
7,663,078 B2 2/2010 Mrag et al.
(Continued)

FOREIGN PATENT DOCUMENTS

DE 10312682 A1 10/2003
DE 102006027836 B3 12/2007
(Continued)

OTHER PUBLICATIONS

Birthe van den Berg et al., "Active focus stabilization for fluorescence microscopy by tracking actively generated infrared spots.", Sep. 22, 2020, bioRxiv, 9 pp., https://doi.org/10.1101/2020.09.22.308197.

*Primary Examiner* — Hesham K Abouzahra
(74) *Attorney, Agent, or Firm* — Kaplan Breyer Schwarz LLP

(57) ABSTRACT
According to a method for autofocusing on a microscopic sample, measurement light having a local structure is generated. The measurement light is coupled into the microscope beam path, whereby the measurement light is incident on, and reflected by, the sample. The measurement light reflected by the sample is output from the microscope beam path and split among a plurality of component beam paths which pass over optical paths of different lengths to image the reflected measurement light, whereby a plurality of measurement images assigned to different focus positions on the microscope beam path are obtained. At least the measurement image which comes closest to an ideal image of the local structure of the measurement light is selected. Depending on the focus position assigned to the selected measurement image, a focus position to be used on the microscope beam path for the purpose of microscopic imaging of the sample is set.

17 Claims, 4 Drawing Sheets

(56)                      References Cited

U.S. PATENT DOCUMENTS

2003/0184856 A1    10/2003  Otaki
2011/0317260 A1*   12/2011  Krueger ............... G02B 21/241
                                                                   359/383
2019/0339503 A1    11/2019  Putman et al.

FOREIGN PATENT DOCUMENTS

DE      102010030430 B4    1/2015
DE      102017218449 B3    2/2019
EP           1840623 A2   10/2007
EP           3204808 B1    5/2021
JP         H11-142716 A    5/1999
JP         2002-156578 A   5/2002
JP         2009-008787 A   1/2009

* cited by examiner

MICROSCOPE AND METHOD FOR AUTOFOCUSING

BACKGROUND OF THE INVENTION

The present invention initially relates to a method for autofocusing on a microscopic sample, which is imaged along a microscope beam path. For this purpose, measurement light which has a local structure is generated. This local structure can be formed by a grid, one or two points, or a crescent shape. Furthermore, the invention relates to a microscope for examining a sample by microscopy.

An autofocus is used to automatically focus a camera or any other piece of optical equipment such as a microscope on a subject, for example on a microscopic sample. The prior art has disclosed various methods for hardware-based autofocusing or an autofocus hold, on which a plurality of primary requirements are placed from the user's point of view. Initially, it should be possible to determine and approach a focus position as accurately as possible. The approached focus position should then be maintained as accurately as possible. A capture region for the autofocusing should be as large as possible, which in the case of microscopy means that the greatest possible variation of different coverslip thicknesses can be used, or that it is possible to focus at different sample depths while the focus is maintained. These primary requirements inevitably lead to the conflicting aims of demanding both great accuracy and a large capture region. Allowing for reasonable outlay, it is not possible to simultaneously obtain great accuracy and a large capture region on account of the physical and technical boundary conditions. In addition to the aforementioned primary requirements, secondary requirements are also placed on an autofocusing method. In principle, autofocusing should be implemented quickly. Especially in microscopy, a sample should be exposed to only a small amount of light exposure caused by hardware-based autofocusing. High reproducibility should be achievable when repeatedly approaching a focus position or an offset focus position. The aforementioned offset focus position is a distance between a reference position, for example a transition from an immersion medium to a coverslip covering the sample, and a depth position in the sample to be recorded. A further secondary requirement is that autofocusing should be as robust as possible vis-à-vis different samples, objectives, embedding media, etc. Furthermore, a high degree of robustness should also be achieved if the field of view contains no structures or only very weak structures of the samples to be imaged. By contrast, software-based autofocusing would only be possible in the case of a visible contrast in samples to be imaged. However, the measures required for hardware-based autofocusing should not be visible in the images to be output. The aforementioned secondary requirements further limit the possible solution space as well.

A method known from the prior art for hardware-based autofocusing in microscopy is called definite focus and described by way of example in DE 10 2006 027 836 A1. According to this method, a grid is projected onto and reflected by a coverslip of a microscopic sample, and then detected by an oblique camera. A location of the sharpest image of the grid represents the focus position. Beam paths for illumination and detection of the grid are output coupled laterally from the regular beam path of the microscope. Illumination is implemented using electromagnetic radiation in the near infrared range. Internal offset focusing is implemented in an embodiment; in this case, an additional displaceable optical unit is used in order to be able to vary the focus position of the image on the camera.

A further method known from the prior art for hardware-based autofocusing in microscopy is referred to as point triangulation autofocus and is described by way of example in DE 10 2017 218 449 B3. According to this method, a point is projected off-axis onto a coverslip of a sample, where it is reflected and then detected by a camera. An intensity centroid of the image of the point represents the focus position. Beam paths for excitation and detection of the point are output coupled laterally from the regular beam path of the microscope. Excitation is implemented using electromagnetic radiation in the near infrared range. There is internal offset focusing in one embodiment. Two points are imaged and detected in another embodiment.

A further method known from the prior art for hardware-based autofocusing in microscopy is referred to as crescent triangulation autofocus and is described by way of example in JP 2004004634 A and US 2003/0184856 A1. According to this method, light is projected via a half-pupil onto a coverslip covering the sample, where it is reflected; it then passes another half-pupil in order to finally be detected by a camera. An intensity centroid of the half-pupil image represents the focus position. Beam paths for excitation and detection are output coupled laterally from the regular beam path of the microscope. Excitation is implemented using electromagnetic radiation in the near infrared range. There is internal offset focusing in one embodiment.

A method known from the prior art for software-based autofocusing envisages that a sample is recorded in different focus positions using a transmitted light method or a fluorescence method; this can be implemented as a z-stack or iteratively. The focus position is determined using a sharpness measure curve of the image of the sample over the focus variation.

A method known from the prior art for hardware-based autofocusing in microscopy is called multi-focus and described by way of example in U.S. Pat. No. 7,663,078 B2. According to this method, a sample is illuminated with regular microscope light. A portion of the light returning from the sample is output coupled from the regular beam path of the microscope via a beam splitter. This output-coupled light is spit into component beams using at least one further beam splitter. The individual component beams then travel along optical paths of different lengths until they are detected by a camera. Due to the optical paths of different lengths, the detected images are located at different distances from the focus position. These distances are ascertained from the images using the sharpness measures known from software-based autofocusing methods. This method does not require a separate illumination beam path.

A further method for hardware-based autofocusing is described in the article "Active focus stabilization for fluorescence microscopy by tracking actively generated infrared spots" in biorxiv, doi.org/10.1101/2020.09.22.308197, September 2020, by van den Berg, B.; Van den Eynde, R.; Müller, M.; Vandenberg, W. and Dedecker, P. According to this method, two points are imaged laterally next to one another on a coverslip covering the sample to be imaged. Doubling occurs on the sample.

To resolve the aforementioned conflicting primary aims, a focus drive is usually actively displaced according to the prior art. The focus drive can be a regular focus drive of the microscope or an additional focus drive, which generates an offset focus in a separate beam path. This resolution of the conflicting aims leads to a plurality of the secondary requirements being significantly less achievable or only being achievable with greater outlay. Thus, the method of the focus drive always leads to a lower speed of the entire measurement sequence necessary for autofocusing. Due to the method of the focus drive, it is also necessary to carry out a plurality of measurements by illuminating the sample, which in turn leads to an increased sample exposure. Especially if a second focus drive is used, reproducibility when repeatedly approaching a focus position or an offset focus position is only achievable with great outlay. Then again, the multi-focus method does not spare the sample either, as the additional images of the sample require a lot of light, which inevitably leads to a higher sample exposure. This is also the case if the hardware-based autofocusing apparatus is currently not in use, as the beam splitter can only be removed with much outlay. A further disadvantage consists in the sample dependence of the used sharpness measures, as also occur in the methods for software-based autofocusing.

Using the prior art as a starting point, it is the object of the present invention to allow hardware-based autofocusing in microscopy to be carried out quickly, accurately, robustly and reproducibly with a large capture region and with little light exposure for the sample.

The specified object is achieved by a method as claimed in appended claim 1 and by a microscope as claimed in appended alternative independent claim 10.

SUMMARY OF THE INVENTION

The method according to the invention serves for hardware-based autofocusing on a microscopic sample, which is imaged along a microscope beam path. Autofocusing is intended to ensure that the microscopic sample is imaged in focus without the need for manual setting of a focus position on the microscope beam path. The focus position on the microscope beam path is modifiable and automatically set by the method to produce a sharp image of the microscopic sample. The microscope beam path is preferably formed in a microscope. On the microscope beam path there is an imaging optical unit, which in particular comprises an objective. Preferably, the imaging optical unit comprises further components, such as preferably a relay optical unit for extending the microscope beam path.

Measurement light for autofocusing is generated in one step of the method and is independent of a light for illuminating the sample for microscopic imaging of the sample. The measurement light has a local structure which serves to establish whether the measurement light is imaged in focus. The local structure represents a local modulation of the measurement light. The local structure is preferably formed by a geometric shape which is exhibited by the measurement light in a plane perpendicular to the direction of propagation of the measurement light.

The local structure is preferably formed by a grid like in accordance with the above-described definite focus method. In an alternative, the local structure is particularly preferably formed by at least one point like in accordance with the above-described point triangulation method. In an alternative, the local structure is particularly preferably formed by a crescent shape or by a semicircle or else by a rectangle, like in accordance with the above-described crescent triangulation method. In principle, other local structures can also be used, such as modifications of the structures or geometric shapes of the measurement light used in the definite focus method, in the point triangulation method or in the crescent triangulation method.

The measurement light is optically input coupled into the microscope beam path in the direction of the sample, and so it at least passes through the objective and is incident on the sample. The measurement light incident on the sample represents an excitation beam and is reflected by the sample. The measurement light reflected by the sample represents a detection beam and reenters the microscope beam path. The measurement light reflected by the sample is optically output coupled from the microscope beam path and split among a plurality of component beam paths. The conventional beam-splitting or beam-combining components from the field of optics, such as preferably one or more prisms, one or more half prisms, or one or more beam splitters, can be used to input couple the measurement light into the microscope beam path and to output couple the reflected measurement light from the microscope beam path. The conventional beam-splitting components from the field of optics can be used to split the reflected measurement light among the plurality of component beam paths. The reflected measurement light can be output coupled from the microscope beam path and the reflected measurement light can be split among the plurality of component beam paths using a single beam-splitting component in special embodiments. The plurality of component beam paths pass over optical paths of different lengths in order to image the reflected measurement light, whereby a plurality of measurement images are obtained. The plurality of measurement images are assigned to different focus positions on the microscope beam path due to their optical paths of different lengths. Each component beam path leads to a respective measurement image.

In a further step of the method, at least the measurement image which comes closest to an ideal image of the structure of the measurement light is determined and selected. The ideal image of the structure of the measurement light is obtained when a focus position from which the sample is imaged in focus is set on the microscope beam path.

In a further step of the method, a focus position on the microscope beam path to be used for microscopic imaging of the sample is automatically set on the basis of the focus position assigned to the selected measurement image, in order to image the sample as sharply as possible. In the simplest case, the focus position assigned to the selected measurement image is set. However, in order to come even closer to the focus position imaging the sample in focus, it is also possible to undertake extrapolations and/or interpolations using the focus position assigned to the selected measurement image as a starting point. The focus positions assigned to the further measurement images can be included in these extrapolations and/or interpolations. When using a triangulation, an intensity centroid of the imaged structure represents the respective focus position, and so in that case the intensity centroid of the imaged optical structure is preferably ascertained in each individual measurement image in order to determine the focus position to be used for the microscopic imaging of the sample. In alternative embodiments in which the optical structure is formed by a grid for example, the sharpness of the imaged optical structure is preferably ascertained in each individual measurement image in order to determine the focus position to be used for the microscopic imaging of the sample.

The method according to the invention has several advantages over the prior art. No offset focusing is required, as the measurement images generated by way of the optical paths of different lengths expand the capture region. This also leads to the mechanical accuracy of optionally present second internal focusing being irrelevant to autofocusing, and this has a positive effect on the approach and subsequent approach of a focus position. This can eliminate the outlay required for a second internal focus drive.

A further advantage of the method according to the invention is that the accuracy of the autofocusing is ensured by virtue of one of the measurement images always being assigned to a focus position which has a sufficiently small distance from a focus position that images the sample in focus. The accuracy of autofocusing can be increased by evaluating a plurality of the measurement images. It is also possible thereby to determine the direction of an offset of the focus position.

A further advantage of the method according to the invention is that the autofocusing can be implemented very quickly, since, in comparison with the prior art, no iterative approaches of a second internal focus drive are required.

A further advantage of the method according to the invention is that it leads to a lower light exposure for the sample than the above-described multi-focus method. Even in comparison with the above-described definite focus method, with the above-described point triangulation method and with the above-described crescent triangulation method, the light exposure for the sample is not increased since the light exposure caused by the measurement light is compensated for by a lack of need for iterations.

The focus position is preferably modifiable by virtue of a distance between at least one lens and the sample to be recorded being modifiable. The at least one lens is a component of the imaging optical unit of the microscope. This lens preferably forms a component of the objective of the microscope, the objective preferably comprising further lenses. A distance between the entire objective and the sample is preferably modifiable. The distance between the at least one lens and the sample to be recorded is preferably modifiable by virtue of a position of the lens or objective being modifiable. An actuator in the form of a focus drive preferably serves to this end. In principle, the sample can also be moved, for example using a height-adjustable sample stage.

The aforementioned ideal image of the structure of the measurement light images the structure as intended. If the local structure is formed by a grid or any other highly detailed structure, for example in a manner comparable to the above-described definite focus method, then the ideal image of the structure of the measurement light images the structure in focus. If the local structure is formed by at least one point, for example in a manner comparable to the above-described point triangulation method, then the ideal image of the structure of the measurement light images the structure on a central axis or in centered fashion. If the local structure is formed by at least one crescent shape or any other symmetrical two-dimensional object, for example in a manner comparable to the above-described crescent triangulation method, then the ideal image of the structure of the measurement light images the structure centrally, preferably on a central axis and/or in symmetrical fashion. Insofar as a triangulation is used, an intensity centroid of the imaged structure is preferably located on a central axis in the ideal image. In the measurement images, the intensity centroid of the imaged structure represents the focus position.

The measurement light input coupled into the microscope beam path and the measurement light reflected by the sample and entering the microscope beam path are preferably guided as in the above-described point triangulation method or the above-described crescent triangulation method. In this respect, the measurement light input coupled into the microscope beam path and the measurement light reflected by the sample and entering the microscope beam path are preferably guided in the microscope beam path according to a triangulation.

In preferred embodiments, the measurement light is input coupled and output coupled at the same position on the microscope beam path.

The microscope beam path is determined by the imaging optical unit. The microscope beam path is preferably located on a central axis of the imaging optical unit; in particular on a central axis of the objective. The microscope beam path is preferably located on a vertical axis.

The measurement light is preferably input coupled into the microscope beam path on an input coupling beam path preferably arranged perpendicularly to the microscope beam path. The input coupling beam path is preferably located on a horizontal axis.

The measurement light reflected by the sample is preferably output coupled from the microscope beam path on an output coupling beam path preferably arranged perpendicularly to the microscope beam path. The output coupling beam path is preferably located on a horizontal axis. The input coupling beam path and the output coupling beam path are preferably located together on one axis. Preferred in an alternative, each component beam path is output coupled individually from the microscope beam path, with the result that output coupling of the reflected measurement light and splitting among the plurality of component beam paths are implemented together.

By preference, at least one beam-splitting and/or beam-combining optical component is used to input couple the measurement light into the microscope beam path, to output couple the measurement light reflected by the sample from the microscope beam path and to split the measurement light reflected by the sample among the plurality of component beam paths. To this end, the beam-splitting and/or beam-combining optical components known from the field of optics can be used in quite different ways. In a first group of preferred embodiments, input coupling of the measurement light into the microscope beam path and output coupling of the measurement light reflected by the sample from the microscope beam path are implemented using a single beam-splitting and beam-combining optical component, which is preferably formed by a prism, by a half prism, by a beam splitter or by a semi-transparent mirror. In principle, however, the measurement light might also be input coupled into the microscope beam path using a beam-combining optical component, while the measurement light reflected by the sample is output coupled using an additional beam-splitting optical component. In the first group of the preferred embodiment, the measurement light reflected by the sample is preferably split among the plurality of component beam paths using at least one further beam-splitting optical component, for example using a respective beam-splitting optical component per component beam path. These beam-splitting optical components are preferably formed by optical beam splitters. In a further group of preferred embodiments, output coupling of the measurement light reflected by the sample from the microscope beam path and splitting of the measurement light reflected by the sample among the plurality of component beam paths are implemented using a single beam-splitting optical component, which is preferably formed by a glass block through which the measurement light reflected by the sample is guided. The glass block is preferably designed as a quarter pupil. The glass block preferably has drilled holes of different depths, which also cause the component beam paths to pass through optical paths of different lengths. Preferred in an alternative, the beam-splitting optical component is formed by a glass wedge through which the measurement light reflected by the sample is guided. The wedge shape also causes the component beam paths to pass through optical paths of different lengths. The glass wedge is preferably designed as a quarter pupil.

The at least one beam-splitting and/or beam-combining optical component for input coupling the measurement light into the microscope beam path and for output coupling the measurement light reflected by the sample from the microscope beam path is preferably arranged in the microscope beam path. The at least one beam-splitting optical component for splitting the measurement light reflected by the sample among the plurality of component beam paths is preferably arranged in the output coupling beam path.

The optical paths of different lengths for the component beam paths are preferably brought about by virtue of the output-coupled measurement light being split among spatially spaced-apart positions, with the result that one of the component beam paths from the output-coupled measurement light is split off at each of these positions. This is preferably implemented using one beam-splitting optical component in each case, or else implemented together for all the component beam paths in a single beam-splitting optical component. The measurement light reflected by the sample and optionally already output coupled from the microscope beam path is split among at least two component beam paths. Preferably, the measurement light reflected by the sample and optionally already output coupled from the microscope beam path is split among at least three component beam paths. In this case, splitting is preferably implemented at equal intervals, particularly preferably using equally spaced beam-splitting optical components.

The optical paths of different lengths for the component beam paths are preferably brought about by virtue of the measurement light reflected by the sample being split into the component beam paths in different directions, with at least one of the component beam paths being deflected on its optical path. The changes in direction during splitting and the deflection make the optical paths different in length. Preferably, already when splitting off a single one of the component beam paths, this component beam path is deflected by an angle greater than 0° and less than 180°, and preferably between 10° and 170° but particularly preferably 90°, relative to the remaining reflected measurement light. This is implemented using the respective beam-splitting optical component. In order to ensure that the last component beam path, i.e. the component beam path not to be split again, also experiences the same alignment, it is deflected by the same angle on its optical path and this can preferably be implemented using a reflective optical component such as for example a mirror. Preferably, the component beam paths to be split off each experience a deflection of 90° when they are split off.

In embodiments in which the local structure of the measurement light is formed by at least one crescent shape, in a manner comparable to the above-described crescent triangulation method, the component beam paths for imaging the reflected measurement light on the measurement images are preferably each angled in such a way that the imaged crescent shapes are directed at one another. To this end, there preferably is a rotation through 90° on an optical axis of the respective component beam path. Preferred in an alternative, the component beam paths are preferably angled in such a way that the imaged crescent shapes are directed away from one another. To this end, there preferably is a rotation through 270° on an optical axis of the respective component beam path. In principle, other angles are also possible.

The component beam paths are preferably incident on an optical detector on which the output-coupled measurement light is imaged, with the measurement images being obtained in this way. Preferably, all component beam paths resulting from the output coupling beam path are incident on the only optical detector. Alternatively, however, a plurality of detectors might also be used for the component beam paths resulting from the output coupling beam path, for example a respective detector for a respective individual component beam path.

The optical detector is preferably selected depending on the local structure of the measurement light used. If the local structure of the measurement light is formed by at least one point for example, then the detector preferably is one-dimensional. The one-dimensional detector is preferably formed by a one-dimensional image sensor, by a multiplicity of quadrant diodes arranged in series or by a multiplicity of photodiodes arranged in series. If the local structure of the measurement light is formed by a grid or by a crescent shape for example, then the detector preferably is two-dimensional. The two-dimensional detector is preferably formed by a two-dimensional image sensor.

The detector is preferably arranged in a plane which is aligned parallel to the respective output coupling beam path or preferably perpendicular to the microscope beam path. In alternative preferred embodiments, the detector is arranged in a plane which is arranged at an angle vis-à-vis the respective output coupling beam path or is aligned at an angle vis-à-vis the microscope beam path. In an alternative or in addition, this inclination causes the component beam paths to pass through optical paths of different lengths.

In preferred embodiments, the at least one detector is pivotable vis-à-vis the component beam paths, with the result that the optical paths for the component beam paths are modifiable.

In preferred embodiments, the measurement light and the light for illuminating the sample for microscopic imaging of the sample differ in terms of their wavelengths, in terms of their polarizations and/or in terms of their temporal occurrence. Preferably, the measurement light is located in a wavelength range which is located above or below a wavelength range in which the light for illuminating the sample is located. The measurement light is preferably located in a wavelength range which is located above or below the visible wavelength range. The measurement light is preferably located in the infrared spectral range of electromagnetic radiation. The measurement light is particularly preferably located in the near-infrared spectral range of electromagnetic radiation. Alternatively, the measurement light is preferably located in the ultraviolet spectral range of electromagnetic radiation.

The microscope according to the invention serves to examine a sample by microscopy. The microscope comprises an imaging optical unit for imaging the sample along a microscope beam path. The microscope also comprises a measurement light source for generating measurement light with a local structure. Furthermore, the microscope comprises at least one beam-splitting and/or beam-combining optical component for input coupling the measurement light into the microscope beam path, for output coupling the measurement light reflected by the sample from the microscope beam path and for splitting the measurement light reflected by the sample among a plurality of component beam paths. The microscope comprises an optical detector for detecting the measurement light reflected by the sample and imaged via the plurality of component beam paths. The component beam paths have optical paths of different lengths to the optical detector. The microscope also comprises a focus drive for automatically setting a focus position on the microscope beam path. The microscope further comprises an electronic autofocus controller serving for automatic control of the focus drive and connected to the optical detector, with the result that information about the component beam paths detected using the detector can be processed by the electronic autofocus controller to control the focus drive in such a way that the focus drive automatically sets the focus position on the microscope from which the microscope images the sample in focus.

The microscope preferably also has features which are specified in the context of the method according to the invention and the preferred embodiments thereof.

BRIEF DESCRIPTION OF THE DRAWINGS

Further details and developments of the invention will become apparent from the following description of preferred embodiments of the invention, with reference being made to the drawing.

DETAILED DESCRIPTION OF THE INVENTION

Figure 1:
FIG. 1 shows a schematic illustration of a preferred embodiment of a microscope according to the invention in a focus position focused on a sample.

FIG. 1 shows a schematic illustration of a preferred embodiment of a microscope according to the invention in a focus position focused on a sample 01. The microscope has an optical axis 02 of an imaging beam path (not shown) of an imaging optical unit, the objective 03 of which is depicted symbolically. A stand beam path of the microscope is not shown. A prism 04 is arranged on the optical axis 02 and serves to input couple measurement light 06 into the imaging beam path (not shown) on the optical axis 02 and output couple it again following a reflection at the sample 01. The beam of measurement light 06 is shaped and has the shape of a crescent (not shown). A first optical lens 07 serves to steer the measurement light 06 generated by a measurement light source (not shown) into a parallel input coupling beam path 08 before it is incident on the prism 04. The measurement light 06 is input coupled into the imaging beam path (not shown) located on the optical axis 02 by the prism 04, with the result that, after passing through the objective 03, said measurement light is incident on the sample 01 from which it is reflected, and a measurement light 09 reflected by the sample 01 is obtained. The measurement light 09 reflected by the sample 01 passes the objective 03 and is incident on the prism 04, the latter now serving to output couple the reflected measurement light 09 from the imaging beam path (not shown) located on the optical axis 02, with the result that an output coupling beam path 11 of the reflected measurement light 09 is obtained. The output coupling beam path 11 of the reflected measurement light 09 is focused by a second optical lens 12 and is subsequently incident on a semi-transparent mirror 13. The semi-transparent mirror 13 splits off a component beam path 14 from the output coupling beam path 11 of the reflected measurement light 09, with the result that two of the component beam paths 14 result overall. The embodiment shown comprises only the one semi-transparent mirror 13; however, use is preferably also made of a plurality of the semi-transparent mirrors 13, with the result that more than two of the component beam paths 14 result. The component beam paths 14 are directed at an image sensor 16 by the semi-transparent mirror 13 or by a mirror 15. On account of the locally spaced-apart deflections of the component beam paths 14, the reflected measurement light 09 travels optical paths of different lengths over the component beam paths 14 to the image sensor 16. Hence, each of the component beam paths 14 is assigned to a focus position settable on the microscope. The component beam paths 14 each image the crescent-shaped reflected measurement light 09 on the image sensor 16. Since the microscope has a focus position focused on the sample 01 in the illustration shown, the component beam path 14 assigned to the currently set focus position on the microscope correctly images the crescent-shaped reflected measurement light 09 on the image sensor 16.

Figure 2:
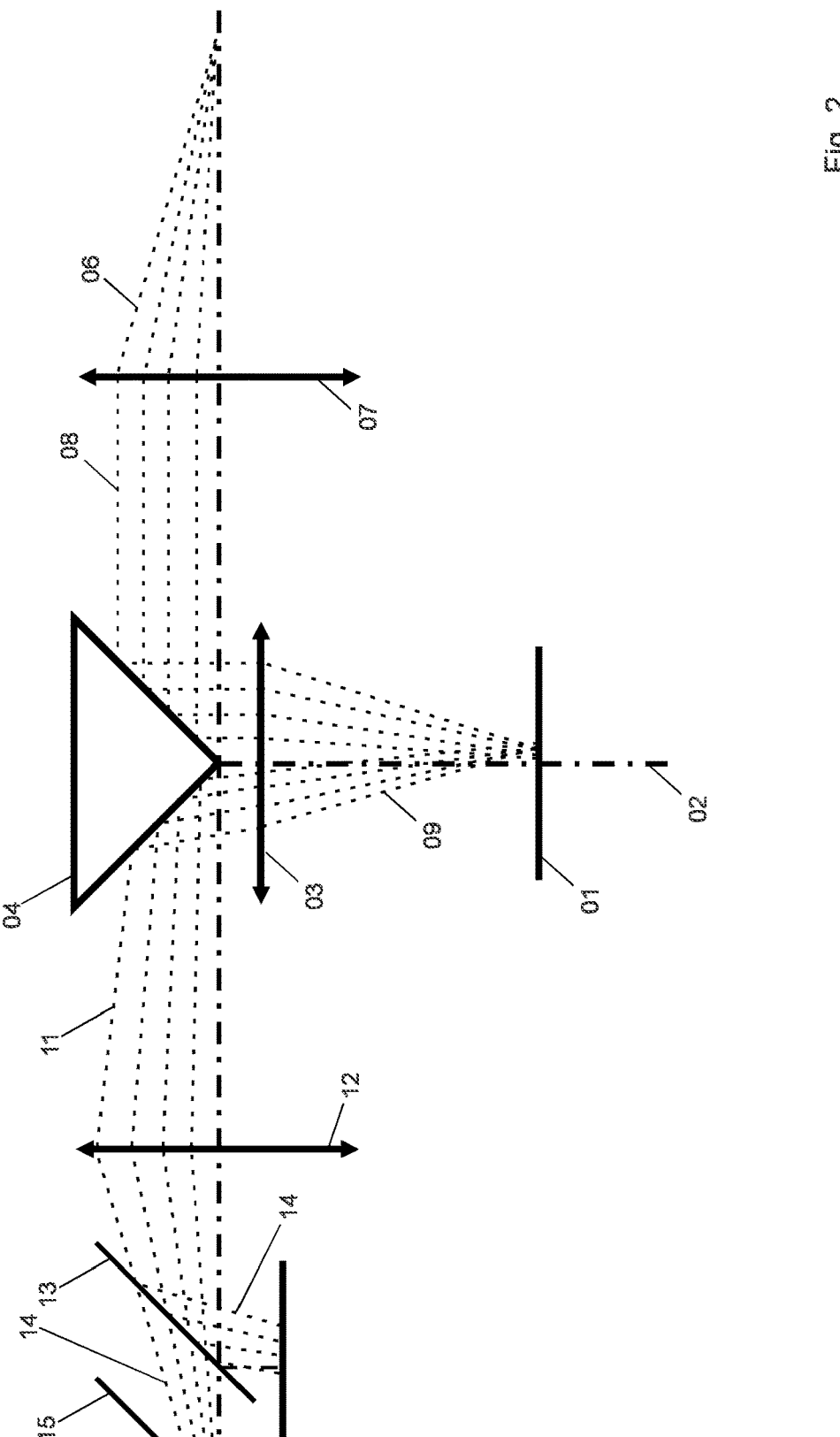
FIG. 2 shows the microscope shown in FIG. 1 in a focus position above the focus position focused on the sample.

FIG. 2 shows the microscope shown in FIG. 1 in a focus position above the focus position focused on the sample 01. This leads to the component beam paths 14 now imaging the crescent-shaped reflected measurement light 09 in offset fashion. According to a preferred embodiment of a method according to the invention, the focus position assigned to the component beam path 14 which correctly images the crescent-shaped reflected measurement light 09 on the image sensor 16 is now automatically set on the microscope by actuating a focus drive (not shown).

Figure 3:
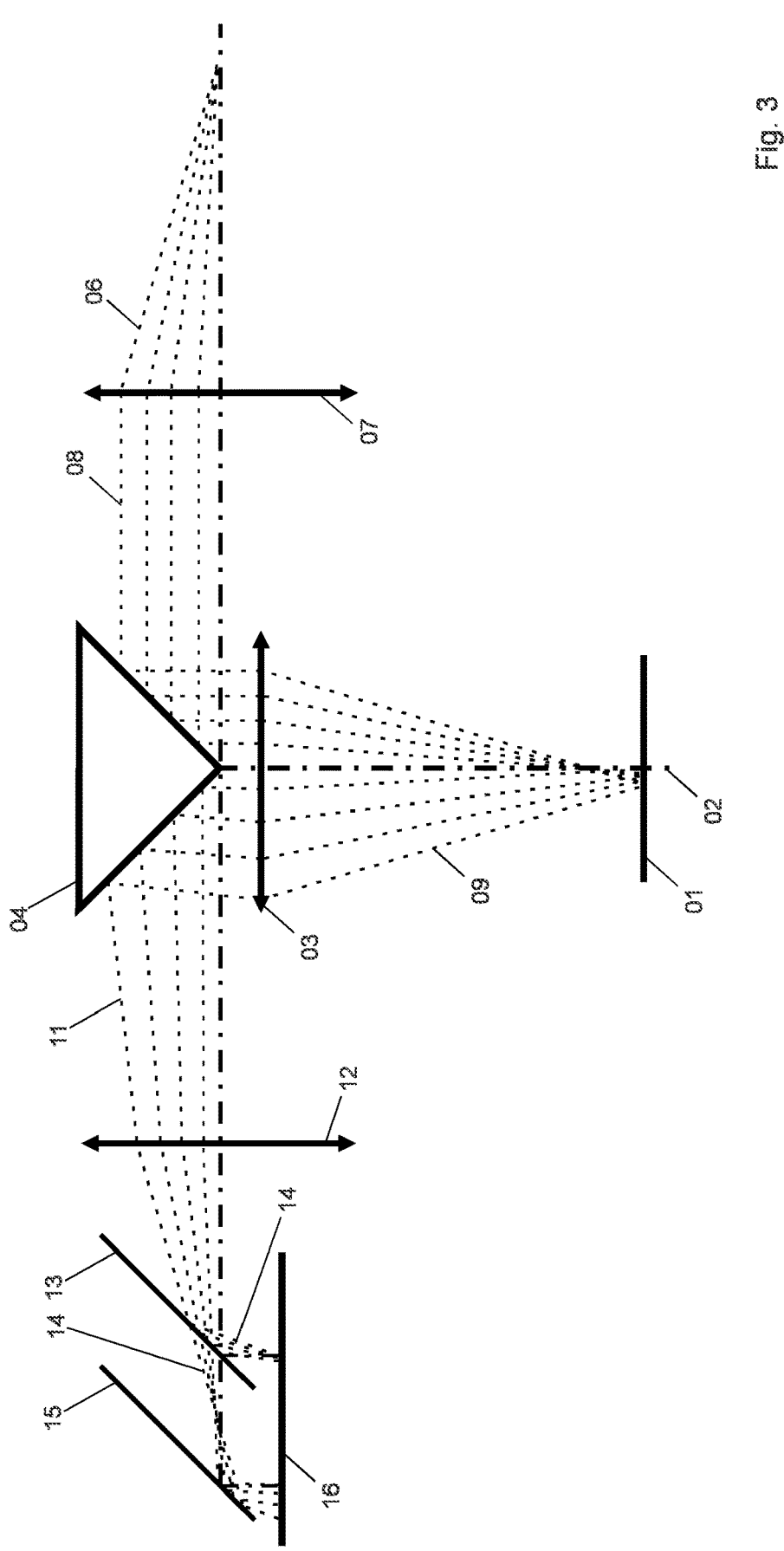
FIG. 3 shows the microscope shown in FIG. 1 in a focus position below the focus position focused on the sample.

FIG. 3 shows the microscope shown in FIG. 1 in a focus position below the focus position focused on the sample 01. This leads to the component beam paths 14 now imaging the crescent-shaped reflected measurement light 09 in offset fashion. According to the preferred embodiment of the method according to the invention, the focus position assigned to the component beam path 14 which correctly images the crescent-shaped reflected measurement light 09 on the image sensor 16 is now automatically set on the microscope by actuating the focus drive (not shown).

Figure 4:
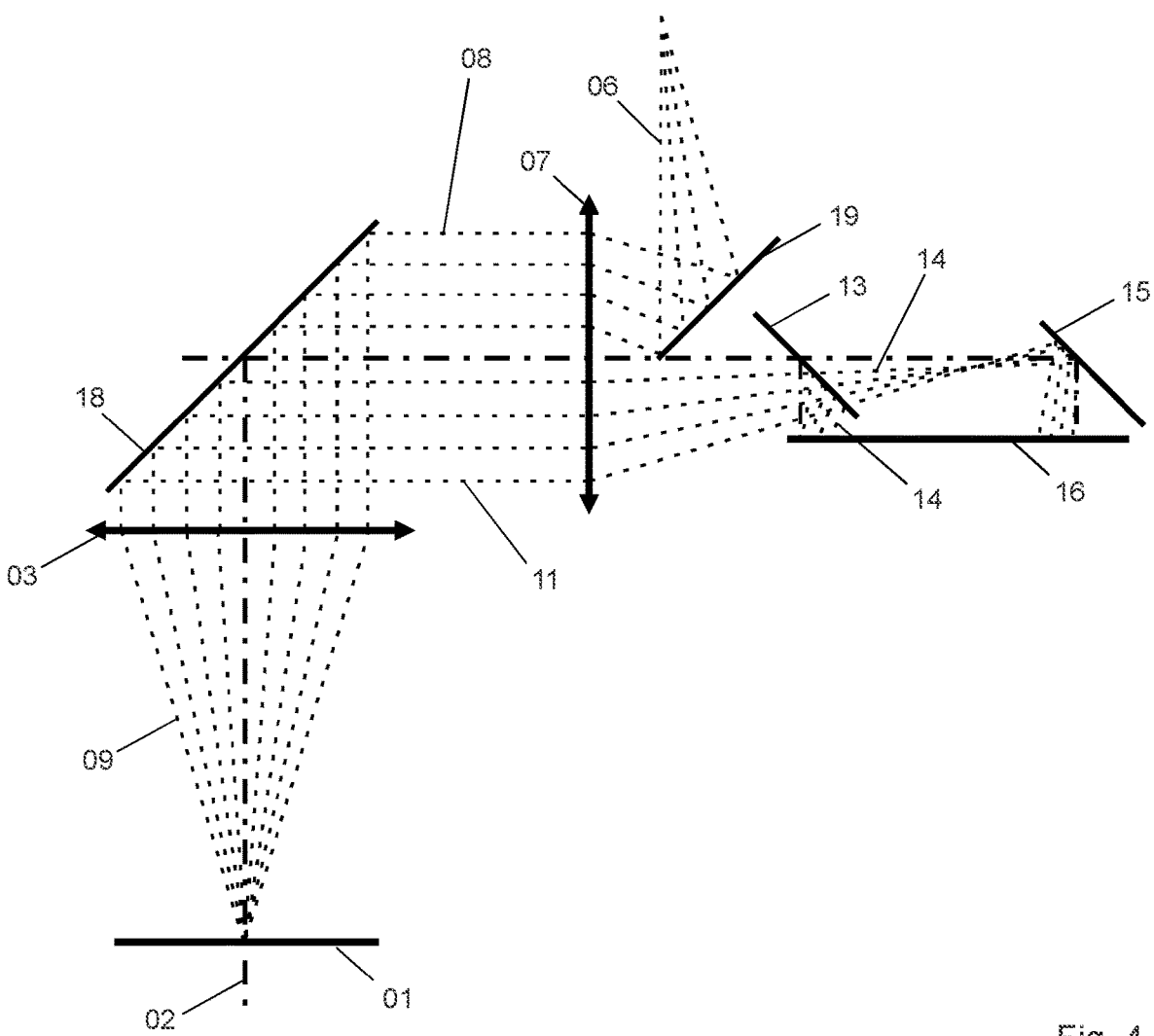
FIG. 4 shows a schematic illustration of a further preferred embodiment of the microscope according to the invention.

FIG. 4 shows a schematic illustration of a further preferred embodiment of the microscope according to the invention. This embodiment comprises a semi-transparent mirror 18, rather than a prism, for input coupling and output coupling the measurement light 06, 09. The measurement light 06 is steered to the first lens 07 via a mirror 19. By using the semi-transparent mirror 18, the input coupling beam path 08 and the output coupling beam path 11 are located on the same side of the optical axis 02, with the result that the output-coupled reflected light 09 on the output coupling beam path 11 also passes through the first lens 07. The stand beam path is not shown inasmuch as it extends vertically upwards on the left side of the optical axis 02 further through the semi-transparent mirror 18.

The invention claimed is:

1. A method for autofocusing on a microscopic sample which is imaged along a microscope beam path, the method comprising the following steps:

for the autofocusing, generating measurement light which has a local structure, wherein the local structure of the measurement light is formed by a grid;

input coupling the measurement light into the microscope beam path, whereby the measurement light is incident on the sample and reflected by the sample;

output coupling the measurement light reflected by the sample from the microscope beam path and splitting it among a plurality of component beam paths which pass over optical paths of different lengths to image the reflected measurement light, whereby a plurality of measurement images assigned to different focus positions on the microscope beam path are obtained;

selecting at least the measurement image which comes closest to an ideal image of the local structure of the measurement light; and depending on the focus position assigned to the selected measurement image, setting a focus position to be used on the microscope beam path for the purpose of microscopic imaging of the sample.

2. The method as claimed in claim 1, wherein the ideal image images the local structure in focus and/or images the local structure in centered fashion and/or images the local structure symmetrically.

3. The method as claimed in claim 1, wherein the measurement light is input coupled into the microscope beam path on an input coupling beam path arranged perpendicularly to the microscope beam path.

4. The method as claimed in claim 3, wherein the measurement light reflected by the sample is output coupled from the microscope beam path on an output coupling beam path, the input coupling beam path and the output coupling beam path being located together on one axis.

5. The method as claimed in claim 1, wherein the optical paths of different lengths for the component beam paths are brought about by virtue of the measurement light reflected by the sample being split into the component beam paths in different directions, with at least one of the component beam paths being deflected on its optical path.

6. The method as claimed in claim 1, wherein the measurement light and a light for illuminating the sample for microscopic imaging of the sample differ in terms of their wavelengths, in terms of their polarizations and/or in terms of their temporal occurrence.

7. The method as claimed in claim 1, wherein the measurement light is in the near infrared spectral range of the electromagnetic radiation.

8. A microscope for examining a sample by microscopy, the microscope is configured for carrying out a method according to claim 1, comprising the following components:

an imaging optical unit for imaging the sample along a microscope beam path;

a measurement light source for generating measurement light with a local structure;

at least one beam-splitting and/or beam-combining optical component for input coupling the measurement light into the microscope beam path, for output coupling the measurement light reflected by the sample from the microscope beam path and for splitting the measurement light reflected by the sample among a plurality of component beam paths;

at least one optical detector for detecting the measurement light reflected by the sample and imaged via the plurality of component beam paths, the component beam paths having optical paths of different lengths to the optical detector;

a focus drive for setting a focus position on the microscope beam path; and an electronic autofocus controller serving for automatic control of the focus drive and connected to the optical detector.

9. The method as claimed in claim 1, wherein the measurement light and a light for illuminating the sample for microscopic imaging of the sample differ in terms of their wavelengths, in terms of their polarizations and/or in terms of their temporal occurrence.

10. A method for autofocusing on a microscopic sample which is imaged along a microscope beam path, the method comprising the following steps:

for the autofocusing, generating measurement light which has a local structure;

input coupling the measurement light into the microscope beam path, whereby the measurement light is incident on the sample and reflected by the sample;

output coupling the measurement light reflected by the sample from the microscope beam path and splitting it among a plurality of component beam paths which pass over optical paths of different lengths to image the reflected measurement light, whereby a plurality of measurement images assigned to different focus positions on the microscope beam path are obtained, wherein the measurement light input coupled into the microscope beam path and the measurement light reflected by the sample and entering the microscope beam path are guided according to a triangulation;

selecting at least the measurement image which comes closest to an ideal image of the local structure of the measurement light; and depending on the focus position assigned to the selected measurement image, setting a focus position to be used on the microscope beam path for the purpose of microscopic imaging of the sample.

11. The method as claimed in claim 10, wherein the local structure of the measurement light is formed by at least one point or by a crescent shape.

12. A microscope for examining a sample by microscopy, the microscope is configured for carrying out a method according to claim 10, comprising the following components:

an imaging optical unit for imaging the sample along a microscope beam path;

a measurement light source for generating measurement light with a local structure;

at least one beam-splitting and/or beam-combining optical component for input coupling the measurement light into the microscope beam path, for output coupling the measurement light reflected by the sample from the microscope beam path and for splitting the measurement light reflected by the sample among a plurality of component beam paths;

at least one optical detector for detecting the measurement light reflected by the sample and imaged via the plurality of component beam paths, the component beam paths having optical paths of different lengths to the optical detector;

a focus drive for setting a focus position on the microscope beam path; and an electronic autofocus controller serving for automatic control of the focus drive and connected to the optical detector.

13. The method as claimed in claim 10, wherein the ideal image images the local structure in focus and/or images the local structure in centered fashion and/or images the local structure symmetrically.

14. The method as claimed in claim 10, wherein the measurement light is input coupled into the microscope beam path on an input coupling beam path arranged perpendicularly to the microscope beam path.

15. The method as claimed in claim 14 wherein the measurement light reflected by the sample is output coupled from the microscope beam path on an output coupling beam path, the input coupling beam path and the output coupling beam path being located together on one axis.

16. The method as claimed in claim 10, wherein the optical paths of different lengths for the component beam paths are brought about by virtue of the measurement light reflected by the sample being split into the component beam paths in different directions, with at least one of the component beam paths being deflected on its optical path.

17. The method as claimed in claim 10, wherein the measurement light is in the near infrared spectral range of the electromagnetic radiation.

\* \* \* \* \*